United States Patent [19]

Beall, Jr.

[11] Patent Number: 4,859,320

[45] Date of Patent: Aug. 22, 1989

[54] LEAK-PROOF WATER PROCESSING UNIT

[76] Inventor: Richard W. Beall, Jr., 229 4th Pl., Manhatten Beach, Calif. 90266

[21] Appl. No.: 95,420

[22] Filed: Sep. 8, 1987

[51] Int. Cl.$^4$ ............................................. B01D 13/00
[52] U.S. Cl. .................................... 210/136; 210/248; 210/321.6; 210/321.85; 210/321.89; 210/433.1; 210/435
[58] Field of Search .................. 210/94, 95, 126, 136, 210/248, 433.1, 321.82–321.9, 435, 436, 472, 652, 321.6

[56] References Cited

U.S. PATENT DOCUMENTS

| | | | |
|---|---|---|---|
| 3,821,108 | 6/1974 | Manjikian | 210/652 |
| 4,160,727 | 7/1979 | Harris, Jr. | 210/248 |
| 4,176,063 | 11/1979 | Tyler | 210/101 |
| 4,695,375 | 9/1987 | Tyler | 210/321.6 |

Primary Examiner—W. Gary Jones
Attorney, Agent, or Firm—Blakely, Sokoloff, Taylor & Zafman

[57] ABSTRACT

The present invention comprises a reverse osmosis water purifying unit in which all the components of the unit are housed in a protective enclosure. In one form the protective enclosure is a water tight protective enclosure which itself is vented to the drain. The only external connections to the enclosure are by means of sealed bulkhead fittings. These fittings are used to connect the water purifying unit to a main water supply line, a dispensing faucet and a drain line. A fourth fitting communicates the inside of the enclosure directly to the drain, or alternatively, the inside of the enclosure is coupled to the drain line internal to the enclosure. The enclosure protects the components of the water purifying system from exposure to outside abuse and damage, and also act to contain and direct and leakage that does occur to prevent any spillage from escaping from the enclosure. Use of a drain line larger than the water supply line allows containment of a leak of any size within a relatively low pressure enclosure. In another form, the protective cause is not sealed, though upon opening, provides easy access to the internal components while providing a water proof service tray to eliminate spillage of water released upon disassembly of the water purifier for servicing.

16 Claims, 4 Drawing Sheets

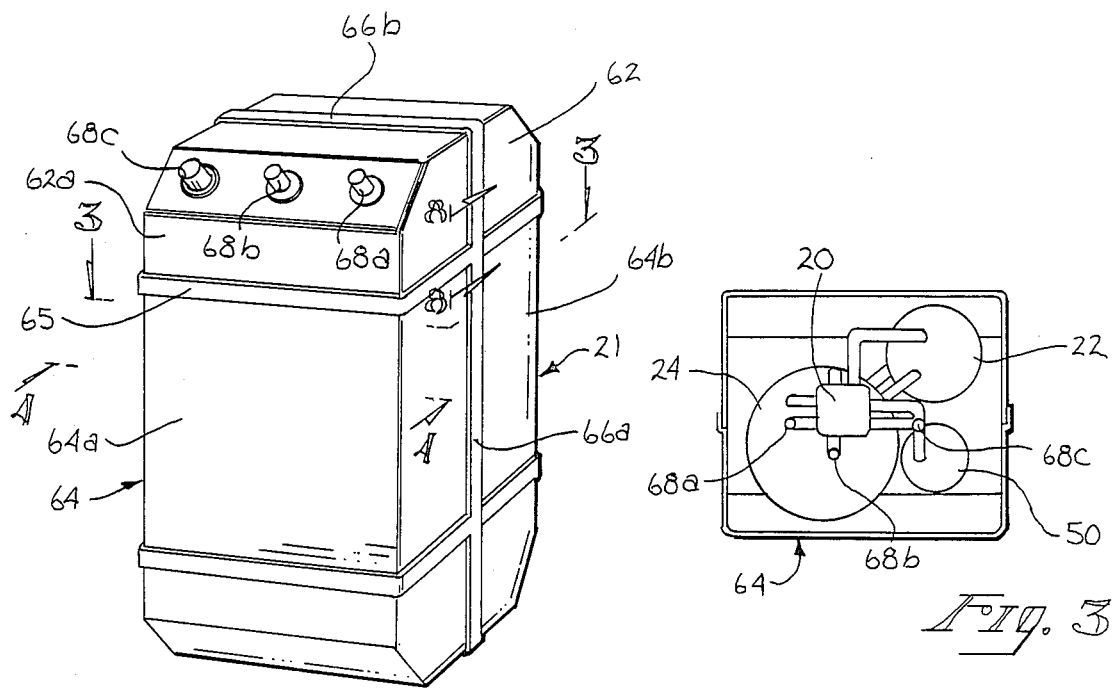
Fig. 2
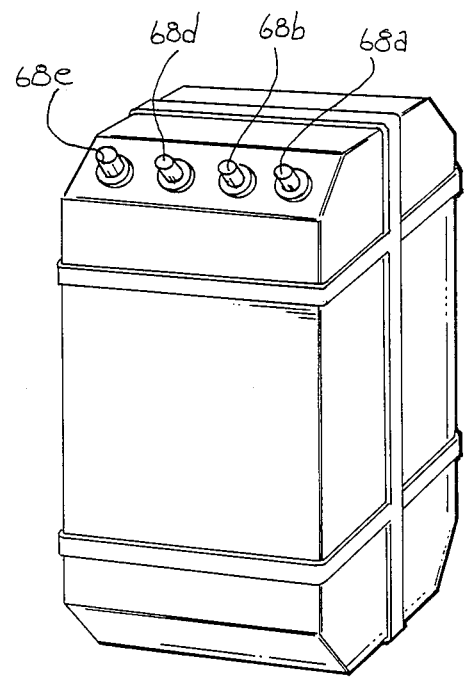
Fig. 3
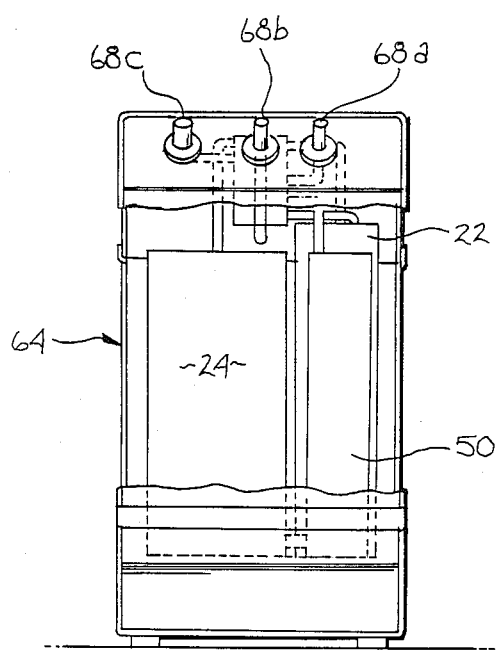
Fig. 4
Fig. 5

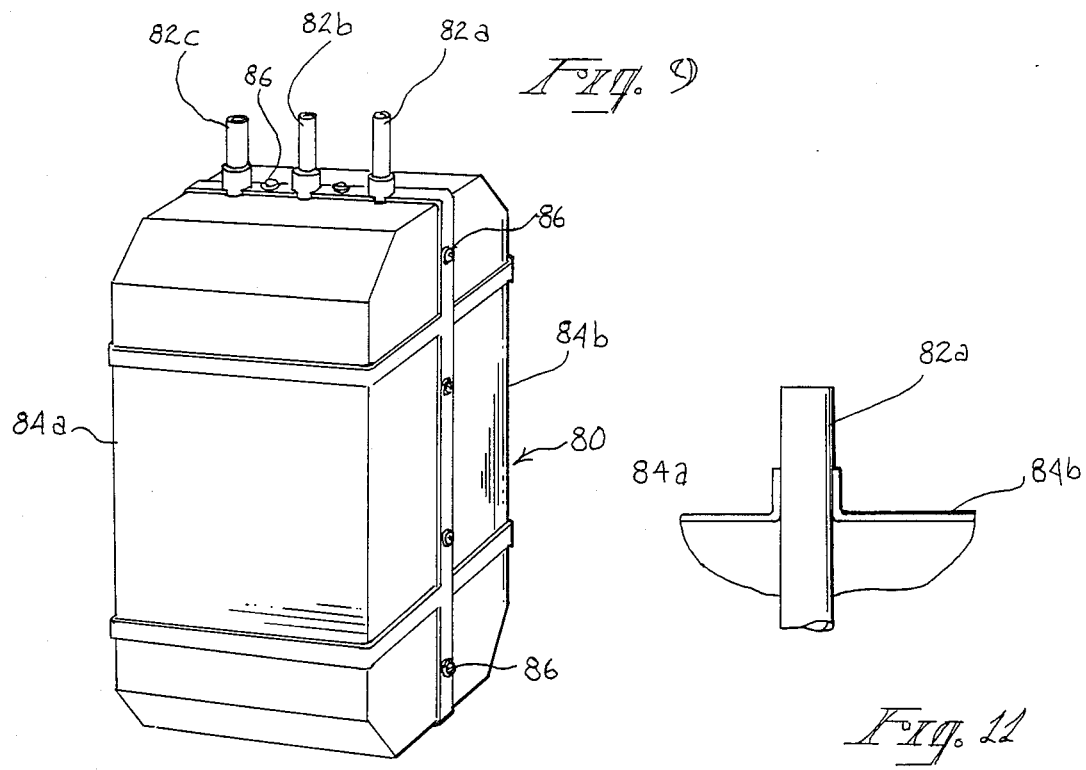
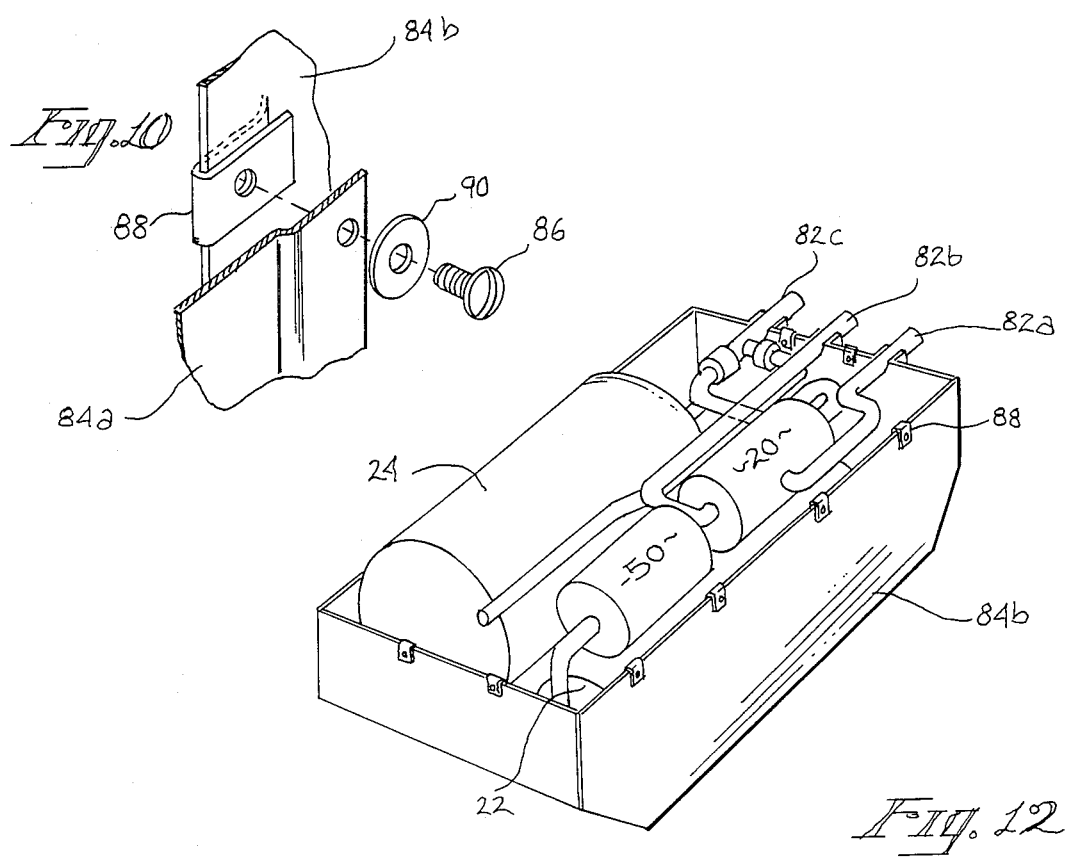

LEAK-PROOF WATER PROCESSING UNIT

BACKGROUND OF THE INVENTION

1. Field of the Invention

The present invention relates to the field of water processing units, and more specifically, to water purifying systems.

2. Prior Art

Increased concerns about impurities that are finding their way into drinking water supplies have led to an increased demand for home water purifying systems that can remove such impurities. Various kinds of water purifying systems are currently being produced. One of the most effective types of water purifying system is a reverse osmosis system, one type being described generally in U.S. Pat. No. 4,176,063 entitled Water Purifier System and Valve. Although reverse osmosis systems are very effective, they are also quite complicated, comprising a relatively large number of separate components. As described in the foregoing patent, a reverse osmosis purifier typically comprises a reverse osmosis unit, a pure water storage tank, and a multi-stage control valve, linked together by a variety of water pipes and tubes. For home use, reverse osmosis water purifying units are often mounted under the kitchen sink. Because the space under the kitchen sink is often used to store cleaning products and cleaning utensils, the individual components and tubes of the water purifier system tend to be exposed to a substantial amount of household traffic. As a result, such units are often damaged. Especially prone to damage are the tube connections with the multi-stage control valve, as the control valve is typically formed from plastic. Since the reverse osmosis unit is usually connected to the main water supply line, a leak, when it occurs, can result in the spillage of large amounts of water into the home.

BRIEF SUMMARY OF THE INVENTION

The present invention comprises a reverse osmosis water purifying unit in which all the components of the unit are housed in a protective enclosure. In one form the protective enclosure is a water tight protective enclosure which itself is vented to the drain. The only external connections to the enclosure are by means of sealed bulkhead fittings. These fittings are used to connect the water purifying unit to a main water supply line, a dispensing faucet and a drain line. A fourth fitting communicates the inside of the enclosure directly to the drain, or alternatively, the inside of the enclosure is coupled to the drain line internal to the enclosure. The enclosure protects the components of the water purifying system from exposure to outside abuse and damage, and also acts to contain and direct any leakage that does occur to prevent any spillage from escaping from the enclosure. Use of a drain line larger than the water supply line allows containment of a leak of any size within a relatively low pressure enclosure. In another form, the protective case is not sealed, though upon opening, provides easy access to the internal components while providing a water proof service tray to eliminate spillage of water released upon disassembly of the water purifier for servicing.

BRIEF DESCRIPTION OF THE DRAWINGS

FIG. 2 is an isometric view illustrating the outside appearance of the enclosure of one embodiment of the present invention.

FIG. 3 is a top sectional view of the enclosure of FIG. 2.

FIG. 4 is a side sectional view of the enclosure of FIGS. 2 and 3.

FIG. 5 is an isometric view illustrating the outside appearance of the enclosure of an alternate embodiment of the invention.

FIG. 9 is an isometric view of an alternate embodiment of the invention.

FIG. 10 is an exploded sectional view illustrating the manner of assembly the two halves of the enclosure of FIG. 9.

FIG. 11 is a partial sectional view of the enclosure of FIG. 9 in the region of a fluid coupling thereto.

FIG. 12 is a view illustrating the embodiment of FIG. 9 with the cover removed so as to serve as a watertight service tray for the unit therewithin.

DETAILED DESCRIPTION OF THE INVENTION

An improved, leak proof, water purification system is disclosed. In the following description, for purposes of explantion, numerous details are set forth, such as specific materials, arrangements and proportions in order to provide a thorough understanding of the present invention. However, it will be apparent to one skilled in the art that the invention may be practiced without these specific details. In other instances, well known articles and components, such as fittings, storage tanks, and reverse osmosis filter membranes have not been described in detail in order not to obscure the present invention unnecessarily.

Figure 1:
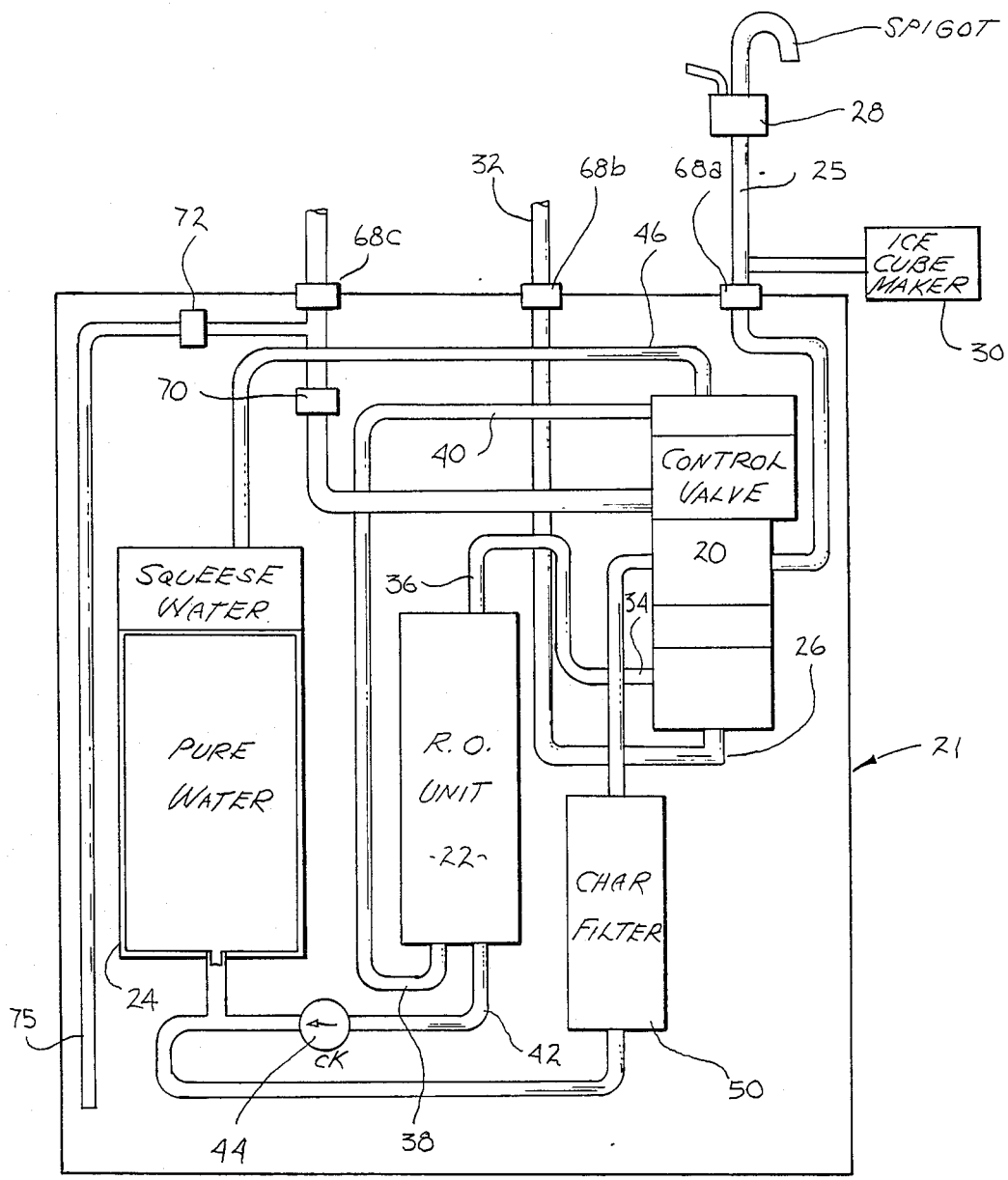
FIG. 1 is a schematic illustrating the major components of a typical reverse osmosis water purifying system as are packaged within the enclosure of the present invention.

Referring first to FIG. 1, a schematic illustration of a reverse osmosis water purifying system incorporating the present invention may be seen. The major components of such a system are a control valve 20, a reverse osmosis unit 22, and a pure water storage tank 24. Unfiltered tap water enters the system through inlet 26 of control valve 20 and pure water is delivered via delivery line 25 to spigot 28 and/or ice cube maker 30. Although one spigot and one ice cube maker are shown, water can be delivered to any number of spigots or appliances, such as for instance, a coffee maker. As may be seen, all of the major components of the water purifier system are enclosed within the leakproof enclosure generally indicated by the numeral 21.

Operation of the system is as follows. Tap water from water line 32 enters the control valve 20 through tap water inlet 26 and flows through tap water outlet 34 into reverse osmosis unit 22 through inlet 36. Reverse osmosis unit 22 contains a membrane through which only pure water can pass. A certain proportion of the tap water passes through the membrane and is purified. The remaining tap water, which contains a higher concentration of dissolved salts and other impurities than the original tap water, flows out of the reverse osmosis unit 22 through waste water outlet 38. Waste water outlet 38 is connected to waste water inlet 40 of control valve 20. The purified water exits the reverse osmosis unit through pure water outlet 42 and flows by way of check valve 44 into a flexible bladder contained in pure water storage tank 24. The bladder insures that there is no communication between the squeeze water used to pressurize the pure water and the pure water contained in the bladder. It should be noted that the reverse osmosis process is driven by the pressure difference between the tap water on one side of the membrane and the pure water on the other side. To obtain the maximum yield of pure water, it is important that during the filtering process, the pure water is under as little pressure as possible. The pressure exerted by the squeeze water on the pure water is one of the functions that is controlled by the control valve 20. Pressurized waste water from the reverse osmosis unit 22 is allowed to flow from the waste water inlet 40 through the squeeze valve of control valve 20 to squeeze water outlet 46 only at times when the spigot is open and pressure is needed to dispense the pure water contained in pure water storage tank 24. The filtering of the tap water, however, is an ongoing process that continues most of the time, halting only when the pure water tank is completely filled with water. Provision must be made for squeeze water contained in the pure water storage tank to drain out of the system as it is displaced by pure water entering the tank. In addition, a limited flow of waste water must be maintained past the reverse osmosis membrane in order to prevent the excessive build up of salts or other impurities on the membrane. Two additional functions of the control valve 20 are therefore to allow squeeze water to drain out of the system at times when the spigot is shut and the pure water tank is not yet full, and to maintain an adequate flow of waste water past the reverse osmosis membrane in order to insure continued efficient operation of the reverse osmosis unit 22. A charcoal filter 50 may also be mounted in line between the pure water storage tank and control valve 20 to allow the absorption of dissolved gases which may not be removed by the reverse osmosis unit.

Reverse osmosis units such as the one described above are typically mounted underneath the kitchen sink in a home. Such a location not only makes the unit difficult to install because of the limited amount of work space available, but also increases the risk that one of the components will be damaged when household items are removed or placed adjacent to the water purifier. The potential for a leak occurring in the system at some time during the life of the water purifying system is therefore fairly significant. Because water is almost always flowing through the system, a leak, if it does occur, could potentially result in severe water damage to a kitchen and other parts of the house.

The present invention overcomes the problems of installation and potential leakage of the prior art by mounting the components of the reverse osmosis system in a sturdy, leak proof enclosure as shown in FIGS. 2 to 4, and schematically in FIG. 1. FIG. 2 illustrates the outside appearance of the preferred embodiment of the present invention. This embodiment comprises an approximately rectangular enclosure 21 comprising a lower, open topped box shaped base section 64, and a top 62. The base section 64 is formed of two pieces, namely plastic member 64a and plastic member 64b, permanently joined on overlapping seam line 66a typically by solvent welding. Similarly, the top 62 is formed of two pieces, specifically plastic member 62a and plastic member 62b, these two pieces also being permanently joined by solvent welding on the overlapping seam 66b.

Figures 7, 8:
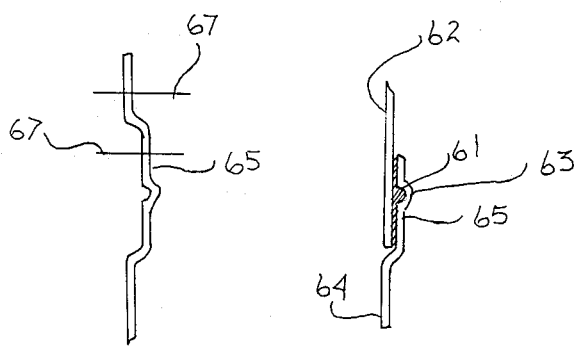
FIG. 7 is a cross-section taken through a vacuum formed part illustrating the manner in which the part is cut to form portions of the top and bottom of the enclosure.
FIG. 8 is a cross-section taken along line 7—7 of FIG. 2.

In the preferred embodiment, the various members making up the enclosure are vacuum formed members formed from a thermoplastic sheet of a thickness on the order of 1/16 inches. For ease of vacuum forming, top section 62a and bottom section 64a are vacuum formed in one piece, with a ribbed like projection 65 being provided between the top and bottom, the piece being somewhat extended in length as shown in FIG. 7, a cross section showing on an expanded scale the detail of the vacuum formed piece in this region. Thereafter, by slicing the vacuum formed parts along lines 67, pieces 62a and 64a are separated (as are pieces 62b and 64b from a similar vacuum formed part). Thereafter, as previously mentioned, members 62a and 62b are solvent welded together, as are members 64a and 64b, resulting in the top and bottom enclosure portions.

Once the water purifier components are mounted or positioned within the enclosure, the top 62 may be placed in position within the vacuum formed rib 65 on the base 64 and sealed with respect thereto by an appropriate sealing material, a silicon rubber sealant being used in region 61 in the preferred embodiment. In that regard, the same protrusion 63 provides space for a reservoir of the uncured rubber, assuring that a high integrity seal is achieved each time a seal is attempted. Also the flexibility of the rubber assures that the integrity of the seal is maintained in spite of some flexing by the enclosure due to external or internal forces, yet allows the seal to be broken when desired by the cutting of the rubber with a sharp knife whenever access to the inside of the enclosure is required for maintenance or repair purposes.

Top 62 contains three bulkhead fittings 68 which form water tight passages through top 62 for making external connections with the water purifier system components contained within the enclosure. Lower ends of two of these bulkhead fittings 68a and 68b are connected to the pure water outlet and the tap water inlet, respectively, on control valve 20 of the water purifier system contained within the enclosure. The third bulkhead fitting 68c is connected through a check valve 70 to the drain water connection on the control valve 20, and through a check valve 72 to the internal volume of the enclosure 21. The check valves 70 and 72 are one way valves both oriented to allow flow out of the enclosure 21 through the bulkhead fitting 68c, but to not allow flow thereinto, either into the enclosure volume through check valve 72 or into the control valve through check valve 70. In the preferred embodiment one piece molded rubber check valves are used, such check valves generally being referred to as "duck bill" check valves.

Figure 6:
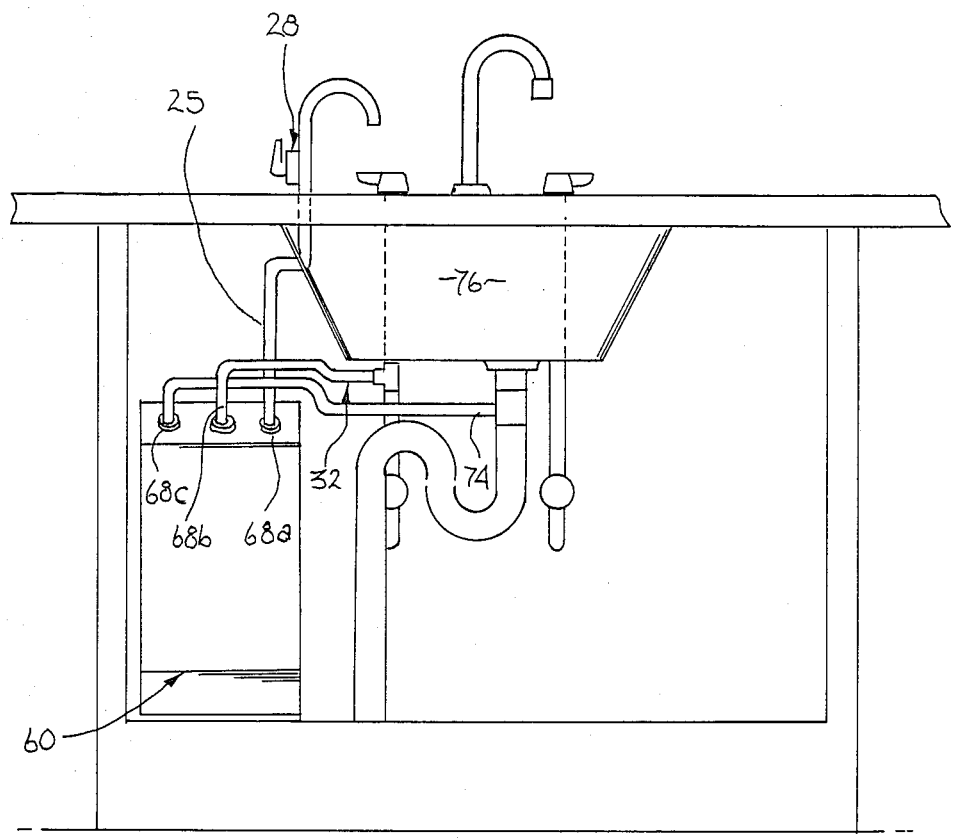
FIG. 6 is a front view illustrating how the present invention can be installed underneath a kitchen sink.

In the preferred embodiment the bulkhead fitting 68c and external lines connected thereto as well as the check valve 72 and the lines connecting the same to the bulkhead fitting 68c are substantially larger than the corresponding bulkhead fittings 68a and 68b and the lines attached thereto. With this arrangement the enclosure 21 serves various purposes. First it provides an attractive enclosure for the water purifying system which otherwise has a rather industrial-like appearance. In normal operation the waste water will pass through check valve 70 and through bulkhead fitting 68c, through a line 74 in a typical installation to drain (see FIG. 6 illustrating a typical installation of the present invention). In case of an internal leak, the water accumulating in the enclosure 21 is blocked from the control valve 20 by check valve 70, and also merely passes out the drain line. The worst form of leak within the enclosure 21 is a totally open tap water line, as could occur by blowing the inlet line connected to bulkhead fitting 68a off of a fitting, or by the rupturing of the line itself. In such a case, however, the rate at which water enters the enclosure will be limited by the size of the inlet lines, typically ¼ inch tubing. Since the enclosure 21 is vented to drain through a larger line, the same flow rate of water may be communicated to the drain without substantial pressurization of the enclosure 21. Accordingly, the use of the larger drain line assures that in the worst case the pressure build up within the enclosure 21 is only a very small fraction of the water line pressure, and inadequate to rupture or otherwise cause a leak in the enclosure. Thus, the enclosure of this embodiment is to be leak proof, though need not be capable of sustaining substantial pressures, thereby allowing the use of a relatively low cost plastic enclosure, in the preferred embodiment a vacuum formed plastic enclosure, though one can also use low cost metal enclosures and the like.

If desired, a sight glass type window may be put on the enclosure to allow one to see whether there is water accumulating in the enclosure around the purifier parts. For this purpose a small window cut in the opaque enclosure and covered from behind with a clear plastic window solvent welded to the enclosure is suitable. However, such a window is difficult to read unless the water level is within the window range so that the water-air interface can be seen. Instead, one can readily determine whether any significant water is accumulating in the enclosure by the response thereto to a tap on the side wall thereof, or by the apparent weight of the system as perceived by wiggling or slightly moving the same. The best indication of any internal leak may be obtained by combinations of the foregoing, using a window very close to the bottom of the enclosure so that the accumulation of any water too small to be detected by rapping the enclosure, etc. will still be visible through the window. Also, large leaks will generally be detectable by the home owner hearing running water in the input line in/or being expelled into the sink line. In that regard, if line 74 connected to the check valve 72 runs to the bottom of the enclosure 21, as shown in FIG. 1, any leakage water will normally be expelled from the enclosure before very much water accumulates therein.

A typical arrangement of the components of the water purifier system within enclosure 60 is illustrated in FIGS. 3 and 4. Pure water tank 24, reverse osmosis unit 22 and charcoal filter 50 generally comprise elongated cylindrical structures that can be placed vertically adjacent to each other in base 64, with the required line interconnections between these components being made prior to placing the components in the enclosure. Control valve 20 is typically disposed above pure water tank 24 or one of the other cylindrical units. All the connections shown in FIG. 1 between pure water tank 24, reverse osmosis unit 22, charcoal filter 50 and control valve 20 are made prior to insertion of the water purifier assembly in base 64 of enclosure 21. The connections between control valve 20 and bulkhead fittings 68a, 68b and 68c can also be made prior to insertion of the assembly in base 64. The water purifier assembly, complete with top 62, can then be inserted in base 64 and sealed by means of silicone rubber sealant, creating a water tight protective container for housing the major components of the water purifier system. In the preferred embodiment, the pure water tank is approximately six inches in diameter and 18 inches long. The reverse osmosis unit is approximately 2½ inches in diameter and 12 inches long, and the charcoal filter is approximately 1¾ inches in diameter and 11 inches long. For components having the above dimensions, appropriate dimensions for the enclosure 21 are approximately 9 inches wide, 7 inches deep and 24 inches high.

FIG. 6 shows a typical installation of a water purifying system in accordance with the present invention as installed under a sink such as a kitchen sink. As previously described, the line connected to the waste water bulkhead fitting 68c is connected to the sink 76 through drainline 74 at a position just above the trap. If, on the other hand, check valves 70 and 72 are not considered adequate to prevent the backup of water into the system or system enclosure due to a drain blockage, dispensing valves of the general type shown as valve 28 are commercially available which include vacuum breaks, or air gaps as they are called, which present the air gap at a level above the sink top level in much the same manner as units commonly used for dishwashers, which in all cases should meet any special requirements imposed on the system. Such valves have three lines, the first of course being the valve pure water line, with the other two being the drain water which is brought to the desired elevation above the top of the sink, and a drain water out line which collects the drain water at a somewhat lower level and directs the same to the sink drain line, respectively.

In some instances, it may be desired to not combine the enclosure vent with the waste water connection in the single waste water port 68c, as done in the embodiments of FIGS. 1 through 4, through the use of check valve 70 and 72. In such event the pure water outlet and tap water line inlet may be provided through fittings 68a and 68b, respectively, as before, but with the drain water line and the enclosure vent being brought out separately through fittings 68d and 68e, respectively, as shown in FIG. 5.

Now referring to FIG. 9, a prospective view of a still further alternate embodiment may be seen. This embodiment is similar to the embodiment of FIGS. 1 through 4, with the exception that the enclosure, generally indicated by the numeral 80, is not sealed and accordingly, the internal volume thereof is not vented to the drain. Consequently, the three line connections thereto comprise a pure water out and tap water in lines 82a and 82b, with the drain water line of the control valve 20 (See FIG. 1) being coupled directly to a drain line 82c. In this embodiment, the enclosure 80 comprises body members 84a and 84b vacuum formed members joined by screws along the vertical seam thereof. The vacuum formed members 84a and 84b may be substantially the same as those used to form the earlier embodiments, though not separated into top and bottom portions as previously illustrated with respect to FIGS. 7 and 8. Instead, the two vacuum formed members 84a and 84b are detachably coupled together by screws 86 as illustrated in FIG. 10. In particular, the edge of body member 84b is provided with a plurality of appropriately positioned holes therethrough over which spring metal clips 88 containing a screw thread on the inner leaf thereof are clipped. Such threaded spring clips are readily commercially available and relatively inexpensive, as even the thread, a single turn thread on the hardened steel spring clip, is formed by stamping techniques. This arrangement allows the use of screws 86 with washers 90 through complimentary disposed holes in body member 84a to simply, reliably and releasably maintain the two body members in the assembled condition.

Since the enclosure 80 is not sealed, sealed fittings for the lines 82a through 82c are not required. Accordingly, as illustrated in FIG. 11, each of the body members 84a and 84b may be formed to provide a short semicylindrical projection to entrap and provide support for each of the lines 82a through 82c. Since these openings are basically on the center plane of the enclosure, the enclosure 80 may be laid on its side and the cover 84a removed to conveniently expose all the various parts of the water purifier, while the body member 84b provides a watertight service tray for retaining any water released by the servicing of the purifier. Thus, by way of example, as lines are removed to change the charcoal filter or to change the membrane in the reverse osmosis unit, the water released as a result thereof will be confined by the body member 84b, allowing the same to be poured out and/or soaked up by a sponge or cloth so that the unit may be serviced in a user's home without creating a mess. Thus while the embodiment of FIGS. 9 through 12 is not sealed in normal use, the enclosure still provides the needed mechanical protection of the internal equipment, provides a pleasing looking unit and facilitates servicing in the user's home without creating a mess requiring subsequent cleanup or even resulting in some damage to woodwork, flooring or the like.

Accordingly, a novel water purifier unit has been disclosed. The present invention provides degrees of protection, leak containment, and ease of installation and maintenance for a water purifier system or other water processing units that were not attainable in the prior art. Although specific details are described herein, it will be understood that various changes can be made in the materials, details, arrangements and the proportions of the various elements of the present invention without departing from the scope of the invention. For example, the bulkhead fittings of the present invention need not be installed in the removable top but may be installed in the base of the enclosure, or some fittings may be installed in the top and others at various locations in the base. The enclosure need not be installed vertically as shown in FIG. 5, but may be installed horizontally or in any other orientation as required by a specific installation. The enclosure of the present invention can be used with other configurations of water purifying systems than the one disclosed, including both reverse osmosis and other kinds of purification systems. Instead of using bulkhead fittings to form water proof passages through the walls of the enclosure, other passage means, such as for instance, pipe segments welded or brazed into the walls of the enclosure can be used out. Other variations will be apparent to those skilled in the art.

I claim:

1. A leakproof water processing system comprising:
    a water processing means having a plurality of fluid communication means coupled thereto to supply water thereto and remove water therefrom, said plurality of fluid communication means and said water processing means being sealed so as to be operative for processing water without water leakage therefrom;
    a watertight enclosure means having an enclosure wall separating the inside and the outside of the enclosure means, said water processing means being disposed inside said watertight enclosure means, said plurality of fluid communication means passing through said enclosure wall and being sealed with respect thereto, thereby providing access to said fluid communication means from outside said watertight enclosure means;
    said inside of said watertight enclosure means being coupled to a drain line, whereby any leakage of water due to the failure of said water processing means to remain sealed will be confined by said watertight enclosure means and directed to said drain line.

2. The water processing system of claim 1 wherein said enclosure means comprises a removable, sealable, lid means for allowing access to said inside of said enclosure means for inspection and servicing of said water processing means.

3. The water processing system of claim 1 wherein said water processing means includes a water filter.

4. The water processing system of claim 1 wherein said water processing means includes a reverse osmosis water purifying means.

5. The water processing system of claim 1 wherein said water processing means includes a reverse osmosis water purifying means having a tap water inlet means, a pure water outlet means and a drain outlet means as first, second and third fluid communication means, respectively.

6. The water processing system of claim 5 wherein said drain outlet means and said inside of said watertight enclosure means are each coupled to said third fluid communication means through check valve means for allowing flow therethrough only toward said third fluid communication means.

7. The water processing system of claim 6 wherein said third fluid communication means is larger than said first fluid communication means.

8. The water processing system of claim 5 further comprising a fourth fluid communication means for providing fluid communication between the inside of said enclosure and an external drain.

9. The water processing system of claim 1 said watertight enclosure means is a plastic enclosure means.

10. The water processing system of claim 9 wherein said plastic enclosure means is a vacuum formed plastic enclosure means.

11. A leakproof, reverse osmosis water purification system comprising:
    a watertight enclosure means having an enclosure wall separating the inside and outside of the enclosure, the enclosure having a removable, sealable cover;
    a reverse osmosis water purification means disposed inside said enclosure means having a tap water inlet means, a pure water outlet means, and a drain water outlet means, said water purification means and said inlet and outlet means being sealed so as to be operative without water leakage therefrom,
    at least three fluid couplings passing through said enclosure wall and being sealed with respect thereto for providing fluid communication between said inside and said outside of said enclosure means;
    a first of said fluid coupling means being coupled to said tap water inlet means of said reverse osmosis water purification means and a tap water supply means external to said enclosure;

a second of said fluid coupling means being coupled to said pure water outlet means for providing fluid communication between said pure water outlet means of said reverse osmosis water purification means and a pure water dispensing means external to said enclosure;

a third of said fluid coupling means being a means for providing fluid communication between said inside of said enclosure means and an external drain means, and for providing fluid communication between said drain water outlet means of said reverse osmosis water purification means and said external drain means;

whereby when said cover is sealed, said water purification means is protectively housed in said enclosure means and any leakage of water into said enclosure means will drain into said external drain means, thereby preventing any external spillage of any leaked water.

12. A leakproof water processing system comprising:
a watertight enclosure means having an enclosure wall separating the inside and outside of the enclosure;
a water processing means including a reverse osmosis water purifying means having a tap water inlet means, a pure water outlet means and a drain outlet means disposed inside said enclosure means;
at least four fluid communication means for providing fluid communication between said inside and said outside of said watertight enclosure means;
a first of said fluid communication means being a means for providing fluid communication between said tap water inlet means of said water processing means and a tap water supply;
a second of said fluid communication means being a means for providing fluid communication between said pure water outlet means of said water processing means and a pure water dispenser;
a third of said fluid comunication means being a means for providing fluid communication between said drain outlet means of said water purification means and an external drain;
a fourth of said fluid communication means being a means for providing fluid communication between said inside of said enclosure means and an external drain;
whereby said water processing means is protectively housed in said enclosure means and any leakage of water therefrom into said enclosure means drains into said external drain, thereby preventing external spillage of leakage water.

13. The water processing system of claim 12 wherein said fourth fluid communication means is larger than said first fluid communication means.

14. A reverse osmosis water purification system comprising:
an enclosure means having an enclosure wall separating the inside and outside of the enclosure, the enclosure means having a first water tight body member and releasable enclosing means for defining together with said first water tight body member, an enclosure;
a reverse osmosis water purification means disposed within said enclosure, said reverse osmosis water purification means having a tap water inlet means, a pure water outlet means, and a drain water outlet means, said water purification means and said inlet and outlet means being sealed so as to be operative without water leakage therefrom;
at least three fluid couplings for providing fluid communication between said inside and said outside of said enclosure;
a first of said fluid coupling means for providing fluid communication between said tap water inlet means of said reverse osmosis water purification means and a tap water supply means;
a second of said fluid coupling means for providing fluid communication between said pure water outlet means of said reverse osmosis water purification means and a pure water dispensing means;
a third of said fluid coupling means for providing fluid communication between said inside of said enclosure means and an external drain means, and for providing fluid communication between said drain water outlet means of said reverse osmosis water purification means and said external drain means;
whereby said enclosure means provides protection to said purification means from physical damage, and when said releasable enclosing means is released, said water purification means is exposed for servicing within said watertight body member, so that leakage of water from said purification means drains into said watertight body member, thereby preventing external spillage of leaked water.

15. The water processing system of claim 14 wherein said enclosure means is a plastic enclosure means.

16. The water processing system of claim 14 wherein said plastic enclosure means is vacuum formed plastic enclosure means.

* * * * *